G. D. BLOCHER.
Milk Cooler.
No. 57,281. Patented Aug. 21, 1866.
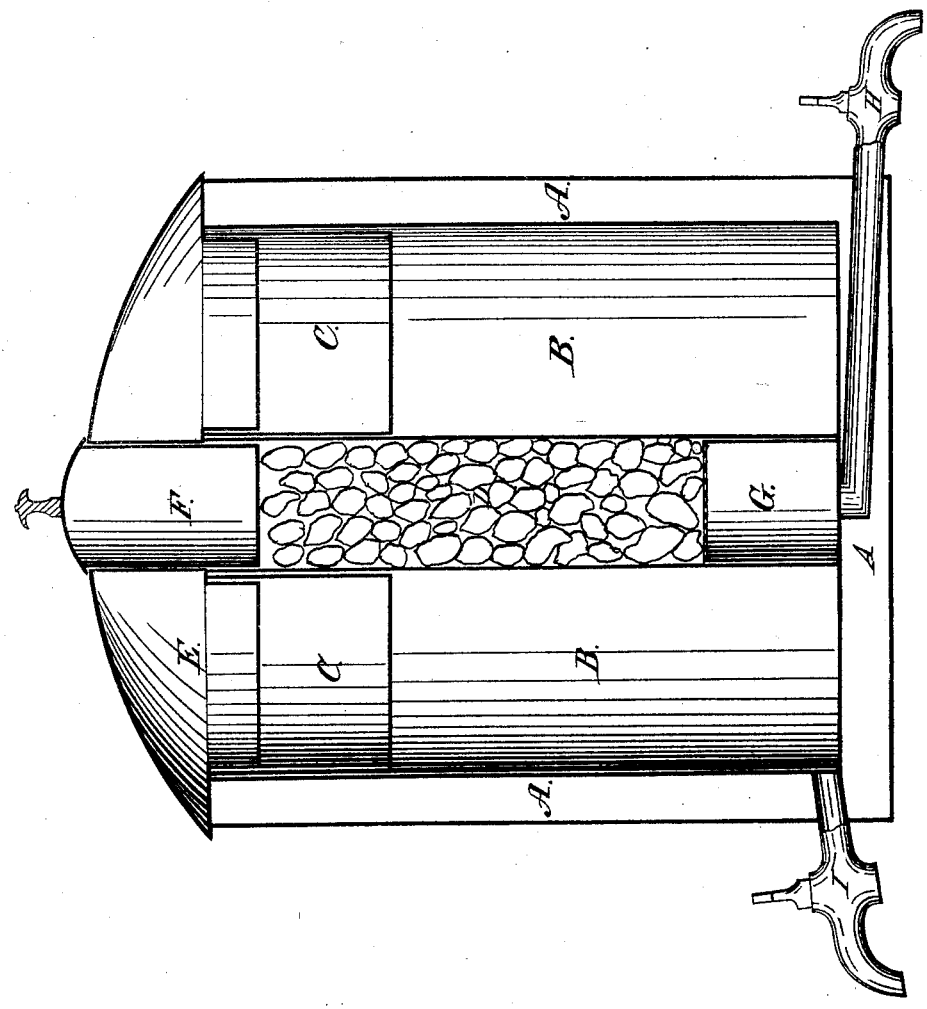
Witnesses:
John A. Myers
O. F. Mayhew
Inventor:
George D Blocher

UNITED STATES PATENT OFFICE.

GEORGE D. BLOCHER, OF INDIANAPOLIS, INDIANA.

IMPROVED COOLER.

Specification forming part of Letters Patent No. 57,281, dated August 21, 1866.

*To all whom it may concern:*

Be it known that I, GEORGE D. BLOCHER, of Indianapolis, in the county of Marion and State of Indiana, have invented a new and useful Combined Milk, Water, and Butter Cooler; and I do hereby declare that the following is a full and exact description thereof, reference being had to the accompanying drawing, making part of this specification, and to the letters of reference marked thereon.

My invention consists in arranging a chamber for ice in the center of any vessel suitable for holding milk, and in connection therewith another vessel that sits into the top of the milk-can and surrounding the ice-chamber for holding butter, meat, &c, the milk and ice chamber being provided with stop-cocks, the melted ice serving as drinking-water.

Another peculiarity of the invention consists in the arrangement of the cover so that the ice may be introduced into the ice-chamber without exposing the milk or other articles contained in the cooler to the air, and to avoid mixing the ice with them.

The drawing represents a vertical transverse section through the center of the cooler.

A is a double external metal case, which may be filled with any non-conducting material, or, better still, simply an air-tight space; B, the milk-chamber; C, a vessel to hold butter, meat, &c.; D, the ice-chamber, placed in the center of the cooler, as shown, and having a strainer near the bottom, on which the ice rests, and forming a water-chamber, G, below, which connects with stop-cock H, from which the water may be drawn off or used for drinking.

I is a stop-cock to the milk-chamber B. E is the cover, also made double, the space being air-tight or filled with some non-conducting material.

The center of the cover is open, as shown, through which the ice may be introduced into the ice-chamber without removing the cover.

The ice-chamber extends up to the top of the cover E, and has a supplementary cover or stopper, F, to exclude the air.

When placing milk or other articles in the cooler the ice-chamber may be kept closed with the cover F.

The butter or meat vessel may be left out, if desired, and the cooler used for milk alone. In this form it is a suitable can for milk-peddlers and dairymen, and either with or without the butter-vessel it forms a convenient and useful article for domestic use or hotels, &c.

The vessel C may be subdivided into two or more parts for holding different articles.

The advantages of arranging the ice-chamber in the center of the cooler are, that less ice will be required to keep the milk cool, they are less cumbrous and more practicable for transporting milk, and are less expensive to make.

I claim—

The central ice-chamber, D, and covers E and F, arranged as shown, and in combination therewith the milk-chamber B and butter-vessel C, substantially as set forth.

GEORGE D. BLOCHER.

Witnesses:
   JOHN A. MYERS,
   O. F. MAYHEW.